United States Patent
Kobayashi

(10) Patent No.: US 10,749,383 B2
(45) Date of Patent: Aug. 18, 2020

(54) POWER TRANSMISSION DEVICE, POWER SUPPLY SYSTEM, AND POWER RECEPTION DEVICE

(71) Applicant: SHARP KABUSHIKI KAISHA, Sakai, Osaka (JP)

(72) Inventor: Hirokazu Kobayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 186 days.

(21) Appl. No.: 16/073,747

(22) PCT Filed: Jan. 24, 2017

(86) PCT No.: PCT/JP2017/002326
§ 371 (c)(1),
(2) Date: Jul. 27, 2018

(87) PCT Pub. No.: WO2017/141641
PCT Pub. Date: Aug. 24, 2017

(65) Prior Publication Data
US 2019/0013700 A1 Jan. 10, 2019

(30) Foreign Application Priority Data
Feb. 15, 2016 (JP) ................. 2016-025994

(51) Int. Cl.
*H02J 50/40* (2016.01)
*H02J 50/80* (2016.01)
*H02J 50/12* (2016.01)
*H02J 50/10* (2016.01)

(52) U.S. Cl.
CPC .............. *H02J 50/40* (2016.02); *H02J 50/10* (2016.02); *H02J 50/12* (2016.02); *H02J 50/80* (2016.02)

(58) Field of Classification Search
CPC .. H02J 50/40; H02J 50/80; H02J 50/10; H02J 50/12
See application file for complete search history.

(56) References Cited

U.S. PATENT DOCUMENTS

2015/0097433 A1 4/2015 Shichino

FOREIGN PATENT DOCUMENTS

| JP | 2010-268610 A | 11/2010 |
|----|---------------|---------|
| JP | 2014-192947 A | 10/2014 |
| JP | 2015-097465 A | 5/2015 |

*Primary Examiner* — Robert L Deberadinis
(74) *Attorney, Agent, or Firm* — ScienBiziP, P.C.

(57) ABSTRACT

A power transmitting unit transmits electric power. A power transmission control unit detects one or more power receiving units that receive the electric power and controls the power transmitting unit so that more electric power is transmitted to a power receiving unit with a higher priority. One aspect of the present invention may be realized as a transmission device; a power supply system including a power receiving unit and the transmission device; or a power supply system further including an electronic device which consumes electric power received by the power receiving unit.

15 Claims, 5 Drawing Sheets

FIG. 1
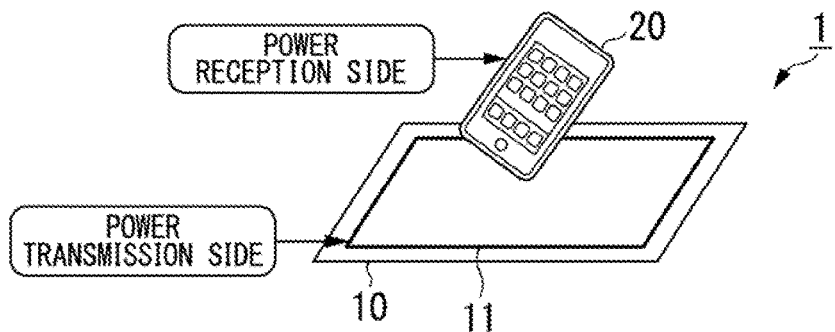
FIG. 2
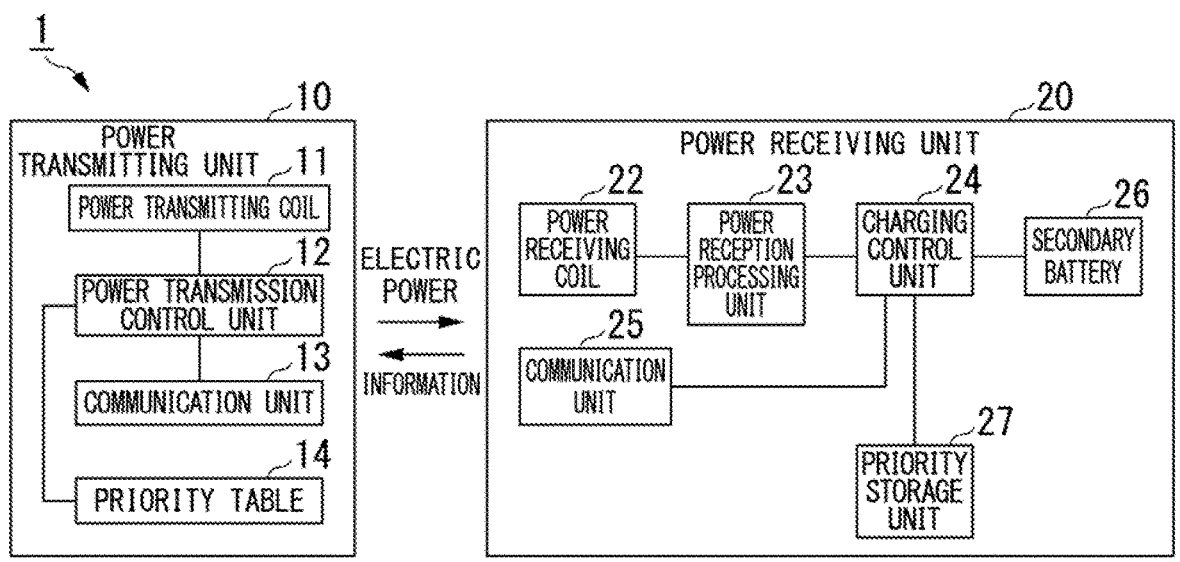
FIG. 3
| ID | PRIORITY |
|---|---|
| 01 | 3 |
| 02 | 5 |
| 03 | 2 |
| 04 | 1 |
| 05 | 3 |

| MEMBER TYPE | PRIORITY |
|---|---|
| PREMIUM MEMBER(REGISTERED MEMBER) | 1 |
| VISIT FREQUENCY IS EQUAL TO OR GREATER THAN 11(REGISTERED MEMBER) | 2 |
| VISIT FREQUENCY RANGES FROM 1 TO 10(REGISTERED MEMBER) | 3 |
| FIRST VISIT(REGISTERED MEMEBR) | 4 |
| FIRST VISIT(UNREGISTERED MEMEBR) | 5 |

POWER TRANSMISSION DEVICE, POWER SUPPLY SYSTEM, AND POWER RECEPTION DEVICE

TECHNICAL FIELD

Some aspects of the invention relate to a power transmission device, a power supply system, and a power reception device.

Priority is claimed on Japanese Patent Application No. 2016-025994, filed Feb. 15, 2016, the content of which is incorporated herein by reference.

BACKGROUND ART

A device such as a mobile phone which is used by a user who is moving generally consumes electric power stored in a battery and thus has to be charged to secure sufficient electric power for the operation thereof. On the other hand, a user may feel inconvenient by an operation of charging. Accordingly, a noncontact power supply system that supplies electric power to various devices in a noncontact (wireless) manner has attracted attention. A noncontact power supply system may be referred to as a noncontact charging system or a noncontact power transmission system. A noncontact power supply system includes a power transmitting unit that transmits electric power using a power supply system such as a magnetic field resonance system and transmits electric power to devices which are located in a charging area which is reached by electromagnetic waves from the power transmitting unit.

On the other hand, a provider of electric power may desire to preferentially provide electric power to a specific device prior to other devices. For example, a charging system for a vehicle described in Patent Document 1 includes a charger for a vehicle, sets a priority for each vehicle to be charged, and distributes charging power to the vehicles depending on the set priorities. The charger for a vehicle includes a charging cable that extends from a charger body and a connector that is attached to a tip of the charging cable and is fitted to a vehicle connector disposed in a vehicle. Electric power is supplied to a vehicle in a wired manner.

PRIOR ART DOCUMENT

Patent Document

[Patent Document 1]
Japanese Unexamined Patent Application, First Publication No. 2014-192947

SUMMARY OF THE INVENTION

Problem to Be Solved by the Invention

A central controller of the charging system for a vehicle described in Patent Document 1 is connected to chargers for a vehicle in a wired manner and thus distributes electric power to the chargers for a vehicle by adjusting charging currents to the chargers for a vehicle as power supply destinations or turning ON/OFF the chargers for a vehicle. However, in a noncontact power supply system, when a plurality of devices are present in a charging area, electromagnetic waves reach all the devices. Accordingly, there is a problem in that electric power cannot be supplied depending on priorities of the devices.

Some aspects of the invention are made in consideration of the above-mentioned circumstances and provide a power transmission device, a power supply system, and a power reception device that can supply electric power depending on priorities of devices which are power transmission destinations.

Means for Solving the Problems

Some aspects of the present invention are made to solve the above-described problem, and one aspect of the present invention is a power transmission device including: a power transmitting unit configured to transmit electric power; and a power transmission control unit configured to detect one or more power receiving units that receive the electric power and control the power transmitting unit so that more electric power is transmitted to a power receiving unit with a higher priority.

Effect of the Invention

According to some aspects of the invention, it is possible to supply electric power to devices which are power transmission destinations depending on priorities of the devices.

BRIEF DESCRIPTION OF THE DRAWINGS

FIG. 1 is a diagram illustrating an outline of a power supply system according to a first embodiment.

FIG. 2 is a block diagram schematically illustrating the power supply system according to the first embodiment.

FIG. 3 is a diagram illustrating an example of a priority table according to the first embodiment.

EMBODIMENTS FOR CARRYING OUT THE INVENTION

First Embodiment

Figures 4, 5:
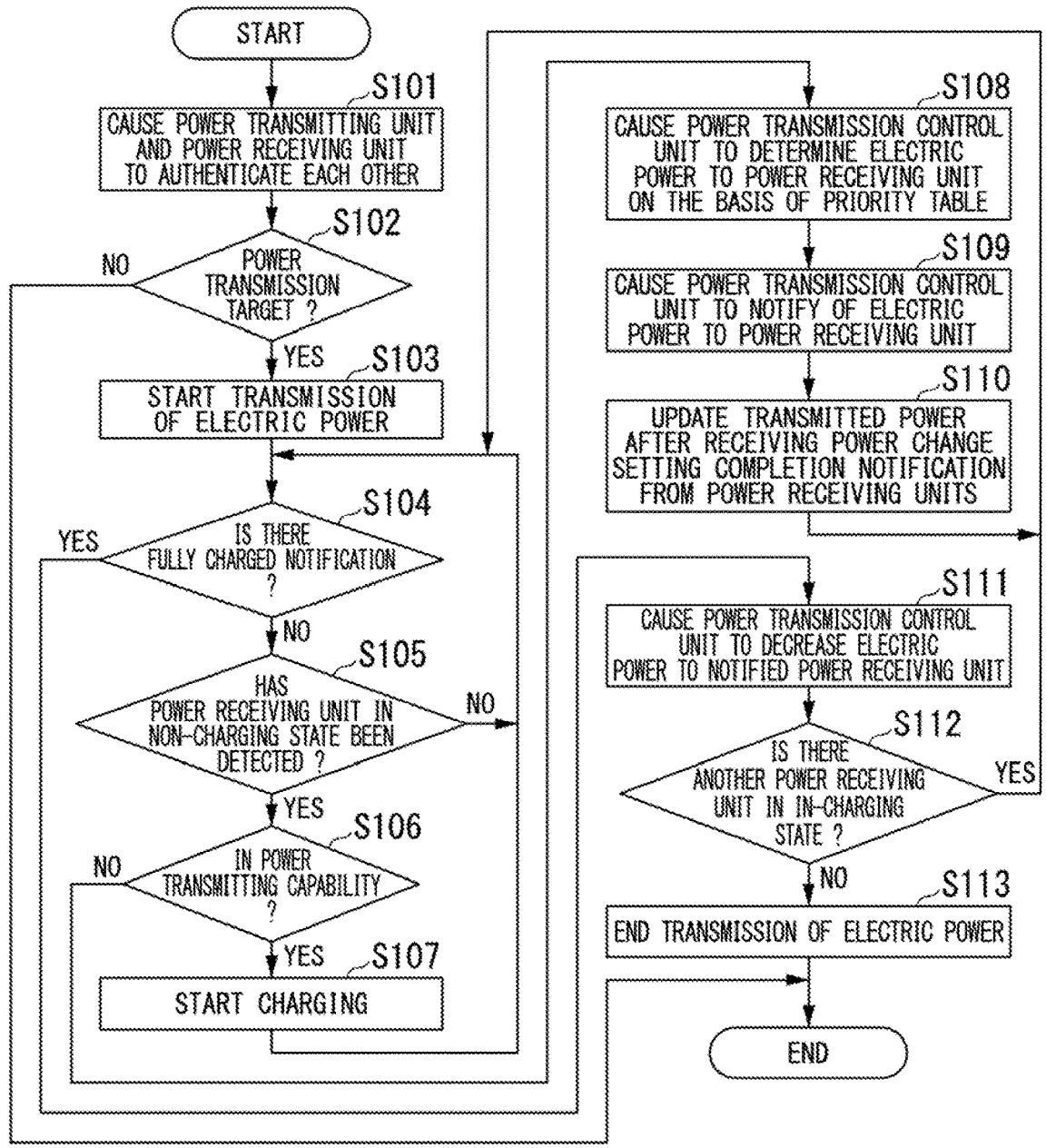
FIG. 4 is a table illustrating correspondence between a member type and a priority according to the first embodiment.
FIG. 5 is a flowchart illustrating a power transmitting process according to the first embodiment.

A first embodiment of the invention will be described below with reference to the accompanying drawings. FIG. 1 is a diagram illustrating an outline of a power supply system 1 according to this embodiment. In the example illustrated in FIG. 1, the power supply system 1 includes a power transmitting unit 10 that is installed on a power transmission side and a power receiving unit 20 that is installed on a power reception side.

The power transmitting unit 10 is configured as a power transmission device including a power transmitting coil 11 that transmits acquired electric power. Supplied AC power flows into the power transmitting coil 11. When a current intensity varies with the elapse of time, a magnetic field intensity around the power transmitting coil 11 varies. This variation is radiated as electromagnetic waves from the power transmitting coil 11.

The power receiving unit 20 receives electric power transmitted using electromagnetic waves when the power receiving unit is located in a charging area which is reached by electromagnetic waves from the power transmitting unit 10. The power receiving unit 20 may be configured as a dedicated power reception device or may be configured as a part of an electronic device that consumes received electric power. Examples of the electronic device include a mobile phone (which includes a smartphone), a tablet terminal device, an electronic book terminal device, and a remote controller (remote control).

For example, a magnetic field resonance system is used for supply of power from the power transmitting unit 10 to the power receiving unit 20. The magnetic field resonance system is a system that causes electric power received by the power receiving unit 20 to resonate with electromagnetic waves generated from the power transmitting unit 10 by matching an oscillation frequency in the power receiving unit 20 with an oscillation frequency in the power transmitting unit 10. With this system, electric power can be wirelessly transmitted with a higher efficiency than in an electromagnetic induction system. For example, a transmission distance over which electric power can be transmitted using the electromagnetic induction system typically ranges from about several mm to 10 cm. On the other hand, with the electromagnetic field resonance system, the transmission distance ranges from 1 m to 2 m and a power-suppliable charging area is significantly wider.

(Power Transmitting Unit)

A functional configuration of the power transmitting unit 10 according to this embodiment will be described below. FIG. 2 is a block diagram schematically illustrating the power supply system 1 according to this embodiment. The power transmitting unit 10 includes a power transmitting coil 11, a power transmission control unit 12, a communication unit 13, and a priority table 14.

A capacitor (not illustrated) and an oscillator (not illustrated) are connected in series to the power transmitting coil 11 to constitute an oscillation circuit. The oscillator generates an alternating current with a predetermined frequency (for example, 110 kHz or 6.78 MHz) on the basis of supplied electric power. The power transmitting coil 11 in which the generated current flows radiates electromagnetic waves. In a predetermined range from the power transmitting coil 11, an area in which an electric field intensity of the radiated electromagnetic waves is higher than a predetermined threshold value of an electric field intensity is formed as a charging area. The oscillator may be supplied with electric power from an internal power source such as a battery or may be supplied with electric power from an external power source via a power line or the like.

The power transmission control unit 12 controls transmission of electric power to the power receiving unit 20. The power transmission control unit 12 detects a power receiving unit 20 which is located in the charging area. The number of power receiving units 20 which are detected is not limited to one and may be two or more. The power transmission control unit 12 transmits, for example, a notification signal including a device identifier (ID) of the power transmission device at predetermined time intervals (for example, every second). Transmission and reception of various data of the power transmitting unit 10 to and from the power receiving unit 20 are performed via the communication unit 13. The power transmission control unit 12 receives a response signal from the power receiving unit 20 as a response to the notification signal. Thereafter, the power transmission control unit 12 transmits an authentication information request to the power receiving unit 20 which is a transmission source of the response signal. The power transmission control unit 12 receives authentication information as a response thereto. The authentication information is, for example, a password. The power transmission control unit 12 compares the received authentication information with authentication information stored in a storage in advance in correlation with a device ID.

When authentication by comparison has succeeded, the power transmission control unit 12 determines that the power receiving unit 20 as a transmission source of the authentication information is a rightful power transmission target and transmits a priority information request to the power receiving unit 20. The power transmission control unit 12 receives a device ID, priority information, and a power receiving capability from the power receiving unit 20 as a response thereto. A power receiving capability is a maximum value of received power which can be received by the power receiving unit 20. The power transmission control unit 12 stores the received device ID and the received priority information in a storage unit (not illustrated) of the power transmitting unit 10 in correlation with each other. When authentication by comparison has not succeeded, the power transmission control unit 12 determines that the power receiving unit 20 as a transmission source of the authentication information is not a rightful power transmission target.

The power transmission control unit 12 calculates the sum of power receiving capabilities of all the power receiving units 20 which have been determined to be a power transmission target as a total power receiving capability, and calculates a total transmitted power by dividing the calculated total power receiving capability by a predetermined transmission efficiency. When the total transmitted power is equal to or less than the power transmitting capability of the power transmitting unit 10, the power transmission control unit 12 determines the receiver power in the power receiving units 20 as the power receiving capabilities of the corresponding power receiving units 20. When the total power transmitting capability is greater than the power transmitting capability of the power transmitting unit 10, the power transmission control unit 12 specifies a priority of each power receiving unit 20 with reference to the priority table 14 and preferentially determines a received power of a power receiving unit 20 of which the specified priority is higher. Here, the total transmitted power based on the received power determined for all the power receiving units 20 as a power transmission target is equal to or less than the power transmitting capability of the power transmitting unit 10. The power transmission control unit 12 transmits information of the received power determined for the power receiving units 20 to the power receiving units 20. The power transmission control unit 12 causes the oscillation circuit to operate so that electromagnetic waves are radiated from the power transmitting coil 11. Through this process, the power transmission control unit 12 allows the power receiving unit 20 to receive electric power using the determined received power.

The power transmission control unit 12 receives charging state information indicating a charging state from the power receiving unit 20. Examples of the charging state include an in-charging state, a non-charging state, and a fully charged state. The in-charging state means that charging is being performed at that time. The non-charging state means that charging is not being performed at that time. The fully charged state means a state in which a secondary battery 26 of a power receiving unit 20 is charged with sufficient electrical energy at that time and it would be difficult to charge the secondary battery with more electrical energy. When the charging state information indicates the fully charged state, transmission of electric power to the power receiving unit 20 which is a device as a transmission source of the charging state information is stopped.

The communication unit 13 transmits data input from the power transmission control unit 12 to the power receiving unit 20 using electromagnetic waves. The communication unit 13 outputs data received from the power receiving unit 20 to the power transmission control unit 12. The communication unit 13 is, for example, a communication interface. The communication unit 13 uses a predetermined local radio communication standard, for example, a communication system defined in IEEE 802.15.1, for transmission and reception of data of the power receiving unit 20. The communication unit 13 may use electromagnetic waves radiated from the power transmitting coil 11 as carrier waves.

As illustrated in FIG. 3, the priority table 14 is formed by correlating device IDs and priority information stored in the storage unit with each other. In the example illustrated in FIG. 3, priority information is expressed by integers of 1 to 5 and indicates a higher priority as the value thereof becomes smaller. A priority may be set depending on a member type for a predetermined store or service or a visit frequency which is an example of usage of a user. In the example illustrated in FIG. 4, the priority of a registered member is higher than the priority of an unregistered member. The priority of a premium member who is an important client in a store is higher than the priority of a general member. The priority of a general member with a higher visit frequency is higher than those of other members. As will be described later, in this embodiment, since a member with a higher priority is preferentially supplied with electric power, a charging time for this member is shortened. Accordingly, the invention can be applied to promotion of visiting or sales to a user of a power receiving unit 20 as a member.

(Power Receiving Unit)

Referring back to FIG. 2, the functional configuration of a power receiving unit 20 will be described below. The power receiving unit 20 is a power reception device including a power receiving coil 22, a power reception processing unit 23, a charging control unit 24, a communication unit 25, a secondary battery 26, and a priority storage unit 27.

The power reception processing unit 23 and the secondary battery 26 are connected in series to the power receiving coil 22 to constitute a power receiving circuit. In the power receiving coil 22, an alternating current is generated due to a variation in electromagnetic waves arriving at the surroundings thereof. By matching a resonance frequency of the power receiving circuit with a resonance frequency of the oscillation circuit of the power transmitting unit 10, a current flowing in the power receiving coil 22 can be caused to resonate using the electromagnetic waves arriving at the power receiving coil 22. Accordingly, the power receiving coil 22 can efficiently receive electric power from the power transmitting unit 10 using the electromagnetic waves. The current flowing in the power receiving coil 22 is output to the power reception processing unit 23.

The power reception processing unit 23 includes a rectifier circuit (not illustrated) that rectifies the alternating current input from the power receiving coil 22 and a power-receiving load (not illustrated) that adjusts a received power of the rectified current. The power-receiving load includes, for example, a variable resistor. A resistance value corresponding to the received power (a target value) input from the charging control unit 24 is set as a resistance value of the power-receiving load. The resistance value is determined depending on the current input to the power reception processing unit 23, the frequency of the arriving electromagnetic waves, and the inductance of the power receiving coil 22. The power reception processing unit 23 supplies the current of which the received power has been adjusted to the secondary battery 26. Electric charge based on the supplied current is accumulated in the secondary battery 26.

The charging control unit 24 controls charging with electric power from the power transmitting unit 10. The charging control unit 24 determines whether a received power of radio waves carrying notification information from the power transmitting unit 10 is higher than a predetermined threshold value of the received power. When it is determined that the received power is higher than the threshold value, the charging control unit 24 reads a device ID which is stored in a storage unit (not illustrated) thereof in advance and transmits a response signal including the read device ID as a response to the notification information to the power transmitting unit 10. Transmission and reception of various data of the power receiving unit 20 to and from the power transmitting unit 10 are performed via the communication unit 25. The threshold value of the received power may be set to a minimum value of the received power which is used to transmit electric power from the power transmitting unit 10. Accordingly, the power transmitting unit 10 can receive a device ID from a power receiving unit 20 which is located in the charging area and detect that the power receiving unit 20 is a power receiving unit 20 located in the charging area.

When an authentication information request is received from the power transmitting unit 10, the charging control unit 24 acquires authentication information of the host unit as a response thereto and transmits the acquired authentication information to the power transmitting unit 10. When a priority information request is received from the power transmitting unit 10, the charging control unit 24 reads priority information and a power receiving capability of the host unit which are stored in the priority storage unit 27 in advance. The charging control unit 24 transmits the device ID, the priority information, and the power receiving capability to the power transmitting unit 10. The charging control unit 24 receives information of the received power from the power transmitting unit 10 to the host unit via the communication unit 25. The charging control unit 24 determines a resistance value based on the received information of the received power and sets the determined resistance value in the power-receiving load of the power reception processing unit 23. Accordingly, electric power corresponding to the received power instructed by the power transmitting unit 10. The charging control unit 24 may include a switch that cuts off a current input to the power reception processing unit 23 when the received power is zero.

The charging control unit 24 measures a voltage between a negative electrode terminal and a positive electrode terminal of the secondary battery 26 and determines a charging state on the basis of the measured voltage. The charging control unit 24 determines that charging is not completed when the measured voltage is lower than a predetermined voltage threshold value, and determines that the secondary battery is fully charged when the measured voltage is equal to or higher than the voltage threshold value. The voltage threshold value is, for example, a nominal voltage of the secondary battery 26. The charging control unit 24 determines that the charging state is an in-charging state when charging is not completed and charging is being performed, and determines that the charging state is a non-charging state when charging is not completed and charging is not being performed. The charging control unit 24 transmits the determined charging state information to the power transmitting unit 10 via the communication unit 25.

The communication unit 25 transmits data input from the charging control unit 24 to the power transmitting unit 10 using electromagnetic waves. The communication unit 25 outputs data received from the power transmitting unit 10 to the charging control unit 24. The communication unit 25 is, for example, a communication interface.

The secondary battery 26 is charged with electric power from the power reception processing unit 23. The secondary battery 26 is electrically connected to a load that consumes the charged electric power.

The priority storage unit 27 includes a storage unit (not illustrated) that stores the priority information and the power receiving capability of the host unit (the power receiving unit 20) in correlation with each other.

(Power Transmitting Process)

A power transmitting process according to this embodiment will be described below. FIG. 5 is a flowchart illustrating a power transmitting process according to this embodiment. The process flow illustrated in FIG. 5 is started at a time point at which the power receiving unit 20 has not yet detected a power transmission target.

(Step S101) The power transmission control unit 12 of the power transmitting unit 10 detects a power receiving unit 20 which is located in a charging area. The power transmission control unit 12 determines whether the detected power receiving unit 20 is a power receiving unit 20 of a rightful user as a power transmission target on the basis of authentication information from the charging control unit 24 of the power receiving unit 20. Thereafter, Step S102 is performed.

(Step S102) When the power transmission control unit 12 determines that the detected power receiving unit 20 is a power receiving unit 20 as a power transmission target (YES in Step S102), Step S103 is performed. When it is determined that the detected power receiving unit 20 is not a power receiving unit 20 as a power transmission target (NO in Step S102), the process flow illustrated in FIG. 5 ends.

(Step S103) The power transmission control unit 12 determines that transmission of electric power to the detected power receiving unit 20 should be started. The power transmission control unit 12 transmits a priority information request to the power receiving unit 20 and receives a device ID, priority information, and a power receiving capability from the power receiving unit 20 as a response thereto. The power transmission control unit 12 determines the received power receiving capability as a received power of the power receiving unit 20 and transmits information of the determined a power to be received by the power receiving unit 20. The power transmission control unit 12 starts supply of electric power from the oscillation circuit and causes the power transmitting coil 11 to transmit electric power corresponding to the transmitted power acquired by dividing the power to be received by the power receiving unit 20 by a transmission efficiency. The charging control unit 24 of the power receiving unit 20 determines a resistance value corresponding to the received power received from the power transmitting unit 10 and sets the determined resistance value in the power-receiving load of the power reception processing unit 23. At this time, the power reception processing unit 23 of the power receiving unit 20 rectifies a current input from the power receiving coil 22 and adjusts the received power on the basis of the set variable resistance. The current of which the received power has been adjusted is supplied to the secondary battery 26. Thereafter, Step S104 is performed.

(Step S104) The power transmission control unit 12 determines whether charging state information (a fully charged notification) indicating a fully charged state has been received from the power receiving unit 20. When it is determined that the charging state information has been received (YES in Step S104), Step S111 is performed. When it is determined that the charging state information has not been received (NO in Step S104), Step S105 is performed.

(Step S105) The power transmission control unit 12 determines whether a power receiving unit 20 of which the charging state is a non-charging state at that time has been detected. At this time, the power transmission control unit 12 performs the same process as in Step S101 and transmits a priority information request to the power receiving unit 20 having been determined to be a power transmission target. The newly detected power receiving unit 20 transmits a device ID, priority information, and a power receiving capability as a response thereto to the power transmitting unit 10. When the charging state information received from the newly detected power receiving unit 20 indicates a non-charging state, the power transmission control unit 12 can determine that a power receiving unit 20 of which the charging state is a non-charging state has been detected. When it is determined that a power receiving unit 20 of which the charging state is a non-charging state has been detected (YES in Step S105), Step S106 is performed. The power receiving unit 20 of which the charging state is a non-charging state and which is detected by the power transmission control unit 12 is added as a power receiving unit 20 which is a new power transmission target. When it is determined that a power receiving unit 20 of which the charging state is a non-charging state has not been detected (NO in Step S105), the process of Step S104 is performed again.

(Step S106) the power transmission control unit 12 calculates a total power receiving capability which is a sum of power receiving capabilities of all the power receiving units 20 as a power transmission target at that time and determines whether a total transmitted power acquired by dividing the total received capability by a predetermined transmission efficiency is equal to or less than the power transmitting capability of the power transmitting unit 10. When it is determined that the total transmitted power is equal to or less than the power transmitting capability (YES in Step S106), Step S107 is performed. When the total transmitted power is greater than the power transmitting capability (NO in Step S106), Step S108 is performed.

(Step S107) The power transmission control unit 12 determines that transmission of electric power to the newly detected power receiving unit 20 should be started. The power transmission control unit 12 changes the electric power supplied from the oscillation circuit and causes the power transmitting coil 11 to transmit electric power corresponding to the total transmitted power obtained by adding the transmitted power, which is obtained by dividing the power to be received by the detected power receiving unit 20 by a transmission efficiency, thereto. Thereafter, Step S104 is performed again.

(Step S108) The power transmission control unit 12 specifies priorities of the power receiving units 20 with reference to the priority table 14, and preferentially determines the received power of the power receiving unit 20 with a higher priority so that the total transmitted power which is a sum of transmitted powers of all the power receiving units 20 is equal to or less than the power transmitting capability of the power transmitting unit 10. Thereafter, Step S109 is performed.

(Step S109) The power transmission control unit 12 transmits (notifies) information of the determined power to be received by the power receiving units 20. The charging control unit 24 of each power receiving unit 20 receives the received power from the power transmitting unit 10, determines a resistance value corresponding to the received power, and sets the determined resistance value in the power-receiving load of the power reception processing unit 23. Thereafter, the charging control unit 24 transmits a power change setting completion notification to the power transmitting unit 10. Thereafter, Step S110 is performed.

(Step S110) After the power change setting completion notification has been received from the respective power receiving units 20, the power transmission control unit 12 updates the electric power which is supplied form the oscillation circuit and causes the power transmitting coil 11 to transmit electric power corresponding to the updated total transmitted power to the power receiving units 20. Thereafter, Step S104 is performed again.

(Step S111) The power transmission control unit 12 stops transmission of electric power to a power receiving unit 20 having transmitted charging state information indicating a fully charged state. The power transmission control unit 12 determines the power to be transmitted to this power receiving unit 20 to be zero and transmits information of the determined transmitted power to the power receiving unit 20. The charging control unit 24 of the power receiving unit 20 stops supply of a current from the power reception processing unit 23 to the secondary battery 26 in response to reception of the transmitted power. The power transmission control unit 12 updates the total transmitted power by excluding the power receiving unit 20 from the power transmission targets and reducing the power to be transmitted to the power receiving unit 20, and causes the power transmitting coil 11 to transmit electric power corresponding to the updated total transmitted power. Thereafter, Step S112 is performed.

(Step S112) The power transmission control unit 12 determines whether there is a power receiving unit 20 of which the charging state is an in-charging state. When it is determined that there is such a power receiving unit 20 (YES in Step S112), Step S104 is performed. When it is determined that there is not such a power receiving unit 20 (NO in Step S112), Step S113 is performed.

(Step S113) The power transmission control unit 12 ends transmission of electric power to the power receiving units 20. Here, the power transmission control unit 12 stops the operation of the oscillation circuit so that electric power is not transmitted from the power transmitting coil 11. Thereafter, the process flow illustrated in FIG. 5 ends.

(Example of Setting Transmitted and Received Power)

An example of a process flow of causing the power transmission control unit 12 to determine transmitted and received power will be described below. The power transmission control unit 12 preferentially transmits electric power to a power receiving unit 20 with a higher priority using the transmitted power corresponding to the power receiving capability thereof. The power transmission control unit 12 calculates a total transmitted power by priority by dividing a total received power by priority which is a sum of received powers of the power receiving units 20 having the same priority by a predetermined transmission efficiency. The power transmission control unit 12 calculates a cumulative total transmitted power, which is obtained by summing the total transmitted powers by priority from a predetermined highest priority to a priority of interest in descending order of priorities, for each priority of interest. The power transmission control unit 12 specifies a priority of interest having the highest cumulative total transmitted power from cumulative total transmitted powers by priority which are not greater than the transmitted power. The power transmission control unit 12 determines the power receiving units 20 from the power receiving units 20 having the predetermined highest priority as power receiving units 20 having a specific priority of interest as power transmission targets. Then, the power transmission control unit 12 sets the power receiving capabilities of the power receiving units 20 as the power transmission targets as the received power thereof and determines the received power of the other power receiving units 20 as being zero. Supply of electric power to the other power receiving units 20 is stopped.

Since the cumulative total transmitted power up to the priority of interest is lower than the power transmitting capability, a power transmission margin which is obtained by subtracting the cumulative total transmitted power from the power transmitting capability may be generated in the power transmitting unit 10. The power transmission control unit 12 calculates a power reception margin by dividing the power transmission margin by a predetermined transmission efficiency. At this time, the power transmission control unit 12 may allocate the power reception margin as a received power to the power receiving unit 20 of which the priority is one stage higher than the priority of interest. In the following description, the priority which is one stage higher is referred to as a limit priority. A plurality of power receiving units 20 having the limit priority may be detected. In this case, the power transmission control unit 12 may allocate the power reception margin as the received power so that transmission of electric power to the power receiving unit 20 receiving electric power at that time is preferentially performed, or may allocate the power reception margin as a received power so that transmission of electric power to an earlier detected power receiving unit 20 is preferentially performed. The power transmission control unit 12 may determine the received power by distributing the power reception margin to the power receiving capabilities of the plurality of power receiving units 20 having the limit priority.

When the total transmitted power by priority of the power receiving units 20 having the limit priority is less than a predetermined threshold value of the transmitted power by priority, the power transmission control unit 12 may stop transmission of electric power by setting a power to be received by the power receiving units 20 associated with this priority to zero.

In another example of setting transmitted and received power, the power transmission control unit 12 may determine a received power of each power receiving unit 20 by multiplying the power receiving capability by a higher distribution factor for the power receiving unit 20 having a higher priority. Here, it is assumed that the total received power obtained by multiplying the power transmitting capability by the corresponding total transmitted power is not greater than the total received power. The distribution factor is a ratio of actual received power to a power receiving capability and has 1 as a maximum value and 0 as a minimum value. For example, the distribution factor for the power receiving unit 20 with a priority of 1 illustrated in FIG. 4 may be normally set to 1 and the distribution factor may be decreased by a predetermined level as the priority is lowered by one step.

As described above, the power transmitting unit 10 according to this embodiment is a power transmission device including: a power transmitting coil 11 that transmits electric power; and a power transmission control unit 12 that detects one or more power receiving units 20 that receive the electric power and preferentially transmits electric power to a power receiving unit with a higher priority when a sum of powers to be transmitted to the power receiving units 20 is greater than a power transmitting capability.

According to this configuration, it is possible to preferentially supply electric power to a power receiving unit 20 with a higher priority as a device of a power transmission destination in noncontact supply of electric power. Accordingly, it is possible to better satisfy demand for electric power in a power receiving unit 20 to which electric power is transmitted prior to other power receiving units 20.

The power transmission control unit 12 stops transmission of electric power to a power receiving unit 20 in which the charging state of the secondary battery 26 is a fully charged state among the power receiving units 20 as power transmission targets.

According to this configuration, a restricted power transmitting capability of a power transmitting unit 10 can be used for transmission of electric power to another power receiving unit 20.

The priority of a power receiving unit 20 is a priority which is determined on the basis of usage of a user of the power receiving unit 20.

Accordingly, electric power can be supplied depending on a usage associated with products and services (which include retail and other services or profits which are not independent transaction objects) which are provided by a manager of the power transmitting unit 10. For example, by preferentially supplying electric power to a power receiving unit 20 of a user who actively uses products or services provided by the manager of the power transmitting unit 10, it is possible to promote the user to use products and services which are provided by the manager being used by a user.

Second Embodiment

Figure 6:
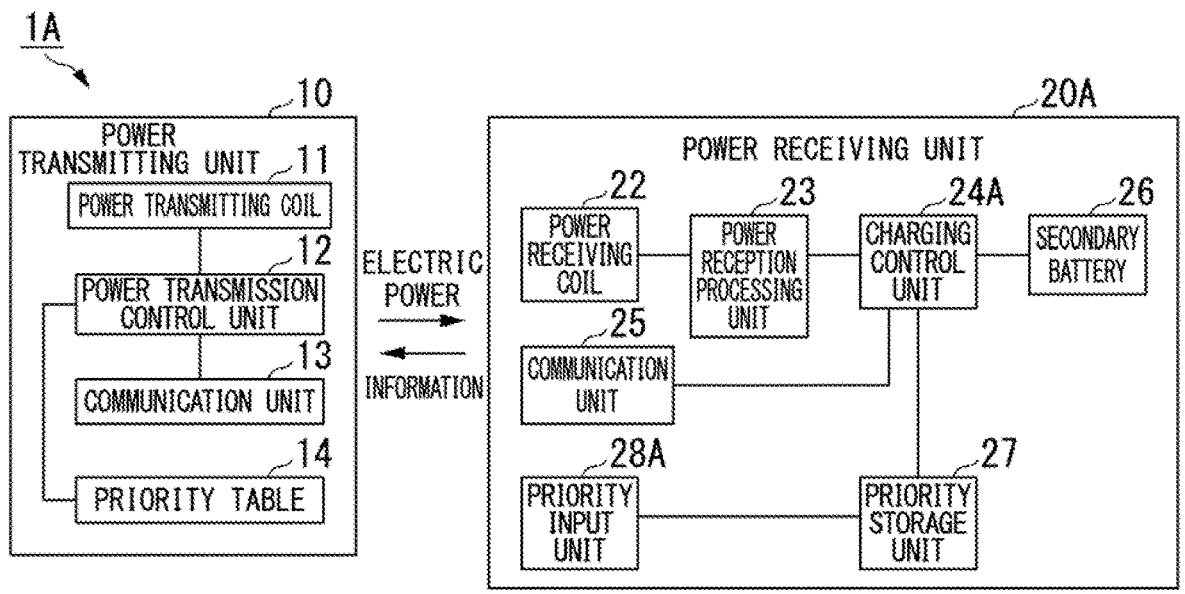
FIG. 6 is a block diagram schematically illustrating a power supply system according to a second embodiment.

A second embodiment of the invention will be described below. The same elements as in the above-mentioned embodiment will be referred to by the same reference signs and description thereof will not be repeated. FIG. 6 is a block diagram schematically illustrating a power supply system 1A according to this embodiment. The power supply system 1A includes a power transmitting unit 10 and a power receiving unit 20A.

The power receiving unit 20A includes a charging control unit 24A instead of the charging control unit 24 in the power receiving unit 20 (FIG. 2) and additionally includes a priority input unit 28A. A priority of the host unit is input to the priority input unit 28A and priority information indicating the input priority is stored in the priority storage unit 27. At this time, the priority information stored in the priority storage unit 27 is updated. The priority input unit 28A may be configured to include an operation device that generates an input signal based on a user's operation or may be configured to include a communication interface that communicates with another device via a wireless or wired network. Examples of the operation device include a mouse, a keyboard, and a touch sensor. The communication interface may be, for example, a device that communicates with another device using a short-range radio communication system defined in IEEE 802.15.1, IEEE 802.15, or the like or a network such as a public telecommunication network or the Internet.

The charging control unit 24A has a configuration that performs the same process as the charging control unit 24. When the priority information stored in the priority storage unit 27 is updated, the charging control unit 24A transmits a priority update notification indicating update to new priority information to the power transmitting unit 10. The priority update notification includes, for example, updated priority information and a device ID of the host unit. The power transmission control unit 12 of the power transmitting unit 10 may change a power to be received by the power receiving unit 20 in response to the priority update notification received from the charging control unit 24A as will be described later.

The charging control unit 24A receives an updated power to be received by the host unit from the power transmitting unit 10 via the communication unit 25. The charging control unit 24A determines a resistance value corresponding to the updated received power and sets the determined resistance value in the power-receiving load of the power reception processing unit 23.

(Priority Changing Process)

Figure 7:
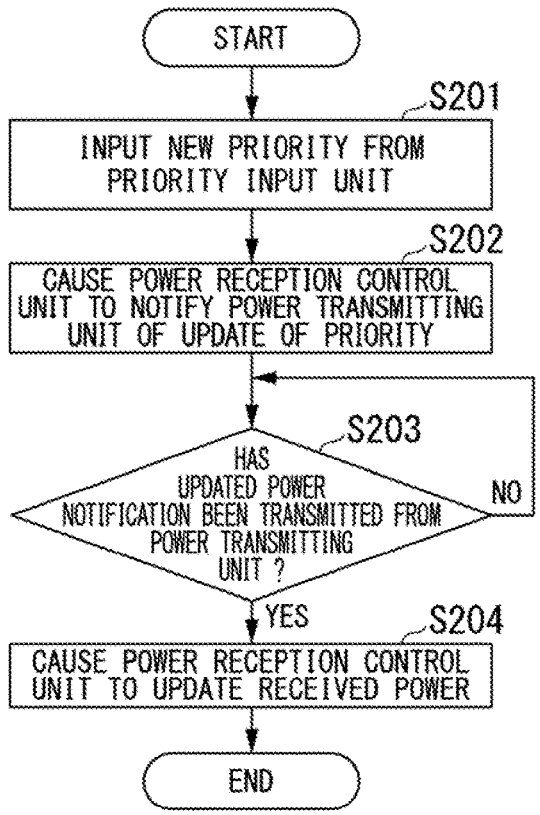
FIG. 7 is a flowchart illustrating a priority changing process which is performed by a power receiving unit according to the second embodiment.

A priority changing process according to this embodiment will be described below. FIG. 7 is a flowchart illustrating a priority changing process which is performed by the power receiving unit 20A according to this embodiment. The process flow illustrated in FIG. 7 is performed when the power receiving unit 20A is receiving electric power from the power transmitting unit 10.

(Step S201) A priority of the host unit is input to the priority input unit 28A, and priority information indicating the input priority is stored in the priority storage unit 27 in correlation with a power receiving capability thereof. Thereafter, Step S202 is performed.

(Step S202) When the priority information stored in the priority storage unit 27 is updated, the charging control unit 24A transmits a priority update notification to the power transmitting unit 10. Thereafter, Step S203 is performed.

(Step S203) The charging control unit 24A determines whether updated received power has been notified from the power transmitting unit 10. When updated received power has been notified (YES in Step S203), Step S204 is performed. When updated received power has not been notified (NO in Step S203), Step S203 is repeatedly performed.

(Step S204) The charging control unit 24A sets a resistance value corresponding to the updated received power in the power-receiving load of the power reception processing unit 23. The charging control unit 24A transmits a power change setting completion notification to the power transmitting unit 10. Accordingly, the power receiving unit 20 can receive electric power using the received power based on the updated priority.

Figure 8:
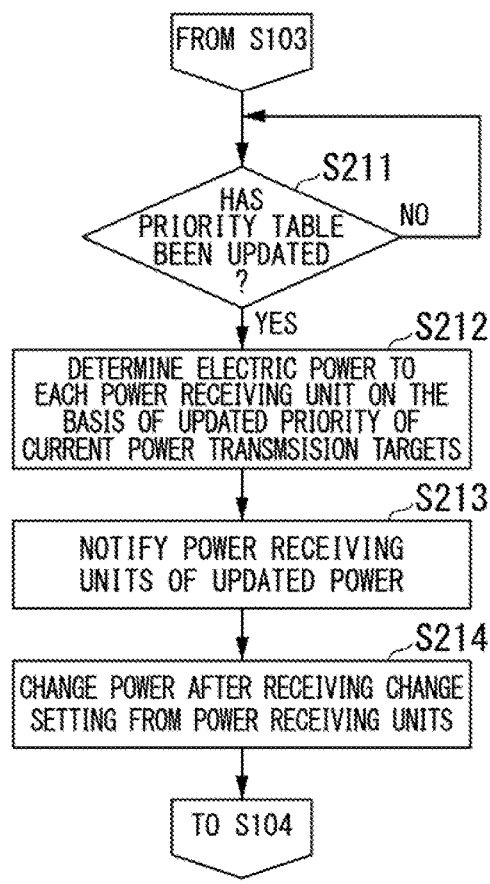
FIG. 8 is a flowchart illustrating a priority changing process which is performed by a power transmitting unit according to the second embodiment.

FIG. 8 is a flowchart illustrating a priority changing process which is performed by a power transmitting unit 10 according to this embodiment. The process flow illustrated in FIG. 8 is started after starting transmission of electric power, that is, immediately before Step S104 illustrated in FIG. 5. The process flow illustrated in FIG. 8 may be started when a power receiving unit 20 has not been detected in Step S105 of FIG. 5, after Step S107, after Step S110, or when there is another power receiving unit 20 being charged in Step S112.

(Step S211) The power transmission control unit 12 determines whether the priority table 14 has been updated. Here, when a priority update notification is received from the power receiving unit 20A, the power transmission control unit 12 specifies the same device ID as the device ID included in the received priority update notification among the device IDs stored in the priority table 14. The power transmission control unit 12 updates the priority information corresponding to the specified device ID to the priority information included in the received priority update notification. When the priority table has been updated (YES in Step S211), Step S212 is performed. When the priority table has not been updated (NO in Step S211), Step S211 is repeatedly performed.

(Step S212) When the total power transmitting capability is greater than the power transmitting capability of the power transmitting unit 10, the power transmission control unit 12 determines a power to be transmitted to the power receiving units 20 as current power transmission targets on the basis of the priorities thereof with reference to the updated priority table 14. Thereafter, Step S213 is performed. When the total power transmitting capability is equal to or less than the power transmitting capability of the power transmitting unit 10, the power to be transmitted to the power receiving units 20 as the current power transmission targets is not particularly changed and the process flow illustrated in FIG. 8 ends.

(Step S213) The power transmission control unit 12 notifies the power receiving unit 20A as a power transmission target of the determined received power as updated received power. Thereafter, Step S214 is performed.

(Step S214) The power transmission control unit 12 causes the power transmitting coil 11 to transmit electric power corresponding to the updated total transmitted power by updating the electric power supplied from the oscillation circuit after receiving the power change setting completion notification from the power receiving unit 20A as a power transmission target. Thereafter, Step S104 is performed.

As described above, regarding the power receiving units 20A according to this embodiment, the power transmission control unit 12 includes the priority table 14 serving as a priority storage unit that stores priorities of the power receiving units 20A. The power transmission control unit 12 updates the priority of the power receiving unit 20A which is notified of a new priority among the priorities stored in the priority table 14 to the new priority.

According to this configuration, electric power is supplied depending on the priority changed in the power receiving unit 20A. For example, by supplying electric power to the power receiving unit 20A depending on the priority based on a usage of a user such as products and services provided for the power receiving unit 20A by a manager of the power transmitting unit 10, it is possible to promote use of products, services, and the like provided by the manager.

Third Embodiment

Figure 9:
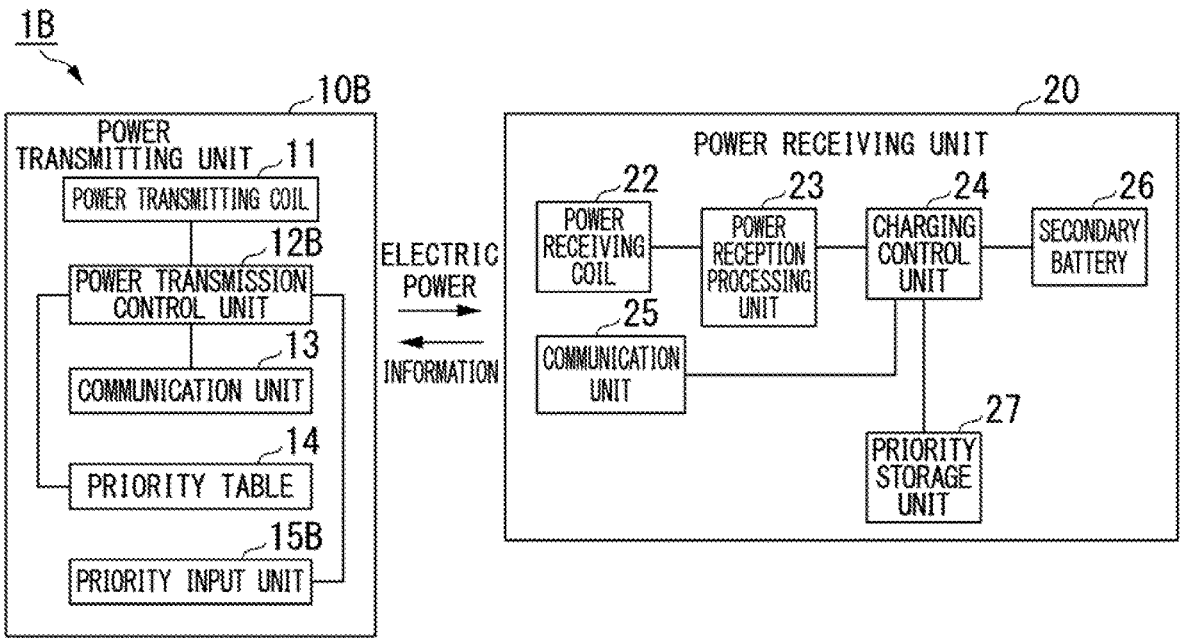
FIG. 9 is a block diagram schematically illustrating a power supply system according to a third embodiment.

A third embodiment of the invention will be described below. The same elements as in the above-mentioned embodiments will be referred to by the same reference signs and description thereof will not be repeated. FIG. 9 is a block diagram schematically illustrating a power supply system 1B according to this embodiment. The power supply system 1B includes a power transmitting unit 10B and a power receiving unit 20.

The power transmitting unit 10B includes a power transmission control unit 12B instead of the power transmission control unit 12 in the power transmitting unit 10 (FIG. 2) and additionally includes a priority input unit 15B. A priority of an arbitrary power receiving unit 20 is input to the priority input unit 15B, and priority information indicating the input priority and a device ID of the power receiving unit 20 are stored in the priority table 14 in correlation with each other. At this time, priority information associated with the power receiving unit 20 among the priority information stored in the priority table 14 is updated.

The power transmission control unit 12B performs the same process as the power transmission control unit 12. Here, when the priority information stored in the priority table 14 has been updated, the power transmission control unit 12B transmits a priority update notification indicating update to new priority information to the power receiving unit 20 of which the priority has been updated. The priority update notification includes, for example, the updated priority information and the device ID of the power receiving unit 20 of which the priority has been updated.

The charging control unit 24 of the power receiving unit 20 of which the priority has been updated receives the priority update notification from the power transmitting unit 10B. The charging control unit 24 updates the priority information stored in the priority storage unit 27 to the priority information indicated by the priority update notification.

Figure 10:
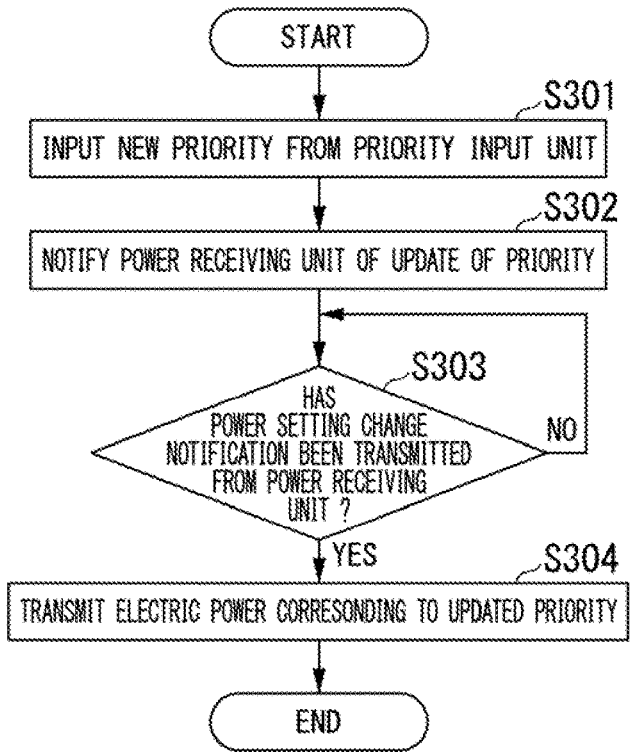
FIG. 10 is a flowchart illustrating a priority changing process which is performed by a power transmitting unit according to the third embodiment.

FIG. 10 is a flowchart illustrating a priority changing process which is performed by a power transmitting unit 10B according to this embodiment. The process flow illustrated in FIG. 10 is started after starting transmission of electric power, that is, immediately before Step S104 illustrated in FIG. 5. The process flow illustrated in FIG. 10 may be started when a power receiving unit 20 has not been detected in Step S105 of FIG. 5, after Step S107, after Step S110, or when there is another power receiving unit 20 in charging in Step S112.

(Step S301) A priority of an instructed power receiving unit 20 is input to the priority input unit 15B, and priority information indicating the input priority and a device ID of the power receiving unit 20 are stored in the priority table 14 in correlation with each other. Thereafter, Step S302 is performed.

(Step S302) The power transmission control unit 12B transmits a priority update notification to the power receiving unit 20 of which the priority has been updated. When the total power transmitting capability is greater than the power transmitting capability of the power transmitting unit 10B, the power transmission control unit 12B determines transmitted power to each power receiving unit 20 as a current power transmission target on the basis of the priorities thereof with reference to the updated priority table 14. The power transmission control unit 12B notifies the power receiving unit 20 of which the received power has been updated of the determined received power as updated received power. Thereafter, Step S303 is performed.

(Step S303) The power transmission control unit 12B determines whether a power change setting completion notification has been received from all the power receiving units 20 of which the received power has been updated.

When a power change setting completion notification has been received (YES in Step S303), Step S304 is performed. When a power change setting completion notification has not been received (NO in Step S303), Step S303 is repeatedly performed.

(Step S304) The power transmission control unit 12B causes the power transmitting coil 11 to transmit electric power corresponding to the updated total transmitted power by updating the electric power supplied from the oscillation circuit. Accordingly, the power receiving unit 20 receives electric power using the received power corresponding to the updated priority. Thereafter, the process flow illustrated in FIG. 10 ends.

Figure 11:
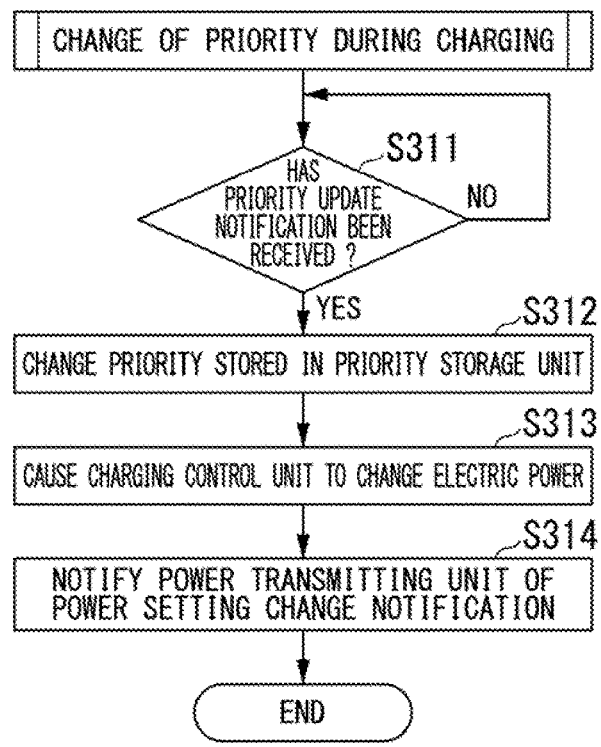
FIG. 11 is a flowchart illustrating a priority changing process which is performed by a power receiving unit according to the third embodiment.

FIG. 11 is a flowchart illustrating a priority changing process which is performed by a power receiving unit 20 according to this embodiment. The process flow illustrated in FIG. 11 is performed when the power receiving unit 20 is receiving electric power from the power transmitting unit 10B.

(Step S311) The charging control unit 24 determines whether a priority update notification has been received from the power transmitting unit 10B. When a priority update notification has been received (YES in Step S311), Step S312 is performed. When a priority update notification has not been received (NO in Step S311), Step S311 is repeatedly performed.

(Step S312) The charging control unit 24 changes the priority information stored in the priority storage unit 27 to the priority information indicated by the priority update notification. Thereafter, Step S313 is performed.

(Step S313) The charging control unit 24 is notified of updated received power from the power transmitting unit 10B. The charging control unit 24 sets a resistance value corresponding to the updated received power in the power-receiving load of the power reception processing unit 23 such that electric power can be received using the notified updated received power. Thereafter, Step S314 is performed.

(Step S314) The charging control unit 24 transmits a power change setting completion notification to the power transmitting unit 10B. Thereafter, the process flow illustrated in FIG. 11 ends.

As described above, the power transmitting unit 10B according to this embodiment includes the priority input unit 15B as a priority acquiring unit that acquires a new priority and information of a power receiving unit 20 to be changed.

According to this configuration, electric power is supplied to the power receiving unit 20 which is instructed to change by the power transmitting unit 10B depending on the updated priority. For example, when means that determines a priority of a power receiving unit 20 of a user on the basis of the user's usage of products, services, and the like provided by a manager of the power transmitting unit 10B is provided, it is possible to supply electric power in consideration of usage.

MODIFIED EXAMPLES

In the above-mentioned embodiments, the power transmission control unit 12 or 12B controls the received power of the power receiving unit 20 or 20A by changing the power-receiving load of the power reception processing unit 23, but the invention is not limited thereto. The power transmission control unit 12 or 12B may control the received power of the power receiving unit 20 or 20A in a time-division manner on the basis of a power transmission time ratio. The power transmission time ratio is a ratio of a power transmission time of a specific power receiving unit 20 or 20A to a predetermined unit time (for example, 0.1 s). When there are a plurality of power receiving units 20 as a power transmission target, the power transmission control unit 12 or 12B determines a power transmission time per unit time (frame) for each power receiving unit 20 or 20A (time-division). The power transmission control unit 12 or 12B may set the power transmission time ratio for a power receiving unit 20 or 20A with a higher priority to be larger, or may not perform charging of a power receiving unit 20 or 20A with a lower priority until charging of the power receiving unit 20 or 20A with a higher priority is completed. The power transmission control unit 12 or 12B may detect completion of charging when charging state information indicating a fully charged state has been received. The power transmission control unit 12 or 12B may set the same power transmission time ratios for power receiving units 20 or 20A with the same priority.

Therefore, the power transmission control unit 12 or 12B generates a power transmission time pattern indicating a power transmission time to the power receiving unit 20 or 20A per unit time and transmits the generated power transmission time pattern to the power receiving unit 20 or 20A. The charging control unit 24 or 24A of the power receiving unit 20 or 20A short-circuits a switch between the power reception processing unit 23 and the secondary battery 26 in the power transmission time indicated by the power transmission time pattern (ON), and opens the switch in other time (OFF). Accordingly, charging is performed in the power transmission time indicated by the power transmission time pattern.

The priority input unit 28A or 15B may count the number of times of detection of the power receiving unit 20 or 20A as a power transmission target or the number of times of transmission of electric power to the power receiving unit 20 or 20A as a criterion of a visit frequency at a facility for managing the power supply system 1A or 1B. The priority input unit 28A or 15B may determine the priority of the power receiving unit 20 or 20A, for example, using the relationship illustrated in FIG. 4 so that the priority becomes higher as the counted number of times becomes larger.

When the positional relationship between the power transmitting coil 11 and the power receiving coil 22 varies, a mutual inductance therebetween also varies and thus the resonance frequency may vary. Therefore, variable inductance may be used for the power receiving coil 22. In this case, the charging control unit 24 or 24A searches for an inductance in which the power received during reception of electric power is maximized and may receive the electric power using the searched-for inductance.

A part of the above-mentioned power transmitting unit 10 or 10B, for example, the power transmission control unit 12, and a part of the power receiving unit 20 or 20A, for example, the charging control unit 24, may be embodied by a computer. In this case, the parts may be embodied by recording a program for realizing the control functions on a computer-readable recording medium and causing a computer system to read and execute the program recorded on the recording medium. The "computer system" mentioned herein is a computer system which is incorporated into the power transmitting unit 10 or 10B or the power receiving unit 20 or 20A and includes an operating system (OS) or hardware such as peripherals.

A part or whole of the power transmitting unit 10 or 10B and the power receiving unit 20 or 20A in the above-mentioned embodiments may be embodied as an integrated circuit such as large scale integration (LSI). The functional blocks of the power transmitting unit 10 or 10B and the power receiving unit 20 or 20A may be individually embodied as processors or a part or all thereof may be integrated as one processor. The integration technique is not limited to an LSI, and the functional blocks may be embodied as a dedicated circuit or a general-purpose processor. If an integration technology with which an LSI can be replaced appears with advancement in semiconductor technology, an integrated circuit based on this technology may be used.

The above-mentioned embodiments and modified examples may be embodied in the following aspects.

(1) A power transmission device including: a power transmitting unit that transmits electric power; and a power transmission control unit that detects one or more power receiving units that receive the electric power and controls the power transmitting unit so that more electric power is transmitted to a power receiving unit with a higher priority.

(2) The power transmission device according to (1), wherein the power transmission control unit controls the power transmitting unit so that transmission of electric power to the power receiving unit of which a state of charge of a secondary battery is full among the power receiving units is stopped.

(3) The power transmission device according to (1) or (2), wherein the priority of the power receiving unit is a priority which is determined on the basis of usage of a user of the power receiving unit.

(4) The power transmission device according to any one of (1) to (3), further including a priority storage unit that stores the priority of the power receiving unit, wherein the power transmission control unit acquires a new priority which is transmitted from the power receiving unit and updates the priority of the power receiving unit stored in the priority storage unit with the new priority.

(5) The power transmission device according to any one of (1) to (3), further including: a priority storage unit that stores the priority of the power receiving unit; and a priority input unit that receives a new priority and information of the power receiving unit to be changed, wherein the power transmission control unit updates the priority of the power receiving unit to be changed which is stored in the priority storage unit with the priority input from the priority input unit.

(6) A power supply system including: the power receiving unit; and the power transmission device according to any one of (1) to (5).

(7) The power supply system according to (6), further including an electronic device that consumes electric power received by the power receiving unit.

(8) A power reception device including: a power receiving unit that receives electric power; and a charging control unit that controls charging with the electric power, wherein the charging control unit transmits a priority and a power receiving capability of the power reception device to a power transmission device that transmits the electric power when a priority information request is received from the power transmission device.

INDUSTRIAL APPLICABILITY

Some aspects of the invention can be applied to a power transmission device, a power supply system, and a power reception device that can supply electric power depending on priorities of devices which are power transmission destinations.

DESCRIPTION OF THE REFERENCE SYMBOLS 1, 1A, 1B Power supply system
10, 10B Power transmitting unit
11 Power transmitting coil
12, 12B Power transmission control unit
13 Communication unit
14 Priority table
15B Priority input unit
20, 20A Power receiving unit
22 Power receiving coil
23 Power reception processing unit
24, 24A Charging control unit
25 Communication unit
26 Secondary battery
27 Priority storage unit
15B, 28A Priority input unit

The invention claimed is:

1. A power transmission device comprising:
one power transmitting unit configured to transmit electric power; and
a power transmission control unit configured to
determine a first electric power and a second electric power higher than the first electric power, the determination being performed based on a first priority and a second priority higher than the first priority,
detect at least one of a first power receiving unit with the first priority and a second power receiving unit with the second priority, the first power receiving unit receiving the electric power transmitted by the one power transmitting unit, the second power receiving unit receiving the electric power transmitted by the one power transmitting unit,
make the first power receiving unit receive the first electric power from the one power transmitting unit by notifying a first power receiving device including the first power receiving unit of information on the first electric power, and
simultaneously make the second power receiving unit receive the second electric power from the one power transmitting unit by notifying a second power receiving device including the second power receiving unit of information on the second electric power.

2. The power transmission device according to claim 1, wherein at least one of the first priority and the second priority is determined based on a usage of a user of the at least one of the first power receiving unit and the second power receiving unit.

3. The power transmission device according to claim 1, the power transmission device further comprising:
a priority storage unit that stores at least one of the first priority and the second priority,
wherein the power transmission control unit is configured to acquire a new priority which is transmitted from the at least one of the first power receiving unit and the second power receiving unit, and update the priority of the at least one of the first power receiving unit and the second power receiving unit, the priority being stored in the priority storage unit with the new priority.

4. The power transmission device according to claim 1, the power transmission device further comprising:
a priority storage unit that stores at least one of the first priority and the second priority; and
a priority input unit configured to receive a new priority and information of the at least one of the first power receiving unit and the second power receiving unit to be changed,
wherein the power transmission control unit is configured to update the priority of the at least one of the first power receiving unit and the second power receiving unit to be changed which is stored in the priority storage unit with the priority input from the priority input unit.

5. The power transmission device according to claim 1, wherein the power transmission control unit is configured to stop a transmission of the electric power to the at least one of the first and second power receiving units by notifying the at least one of the first and second power receiving units of that the electric power of the at least one of the first and second power receiving units whose charging state of a secondary battery became a fully charged state is set to be zero from the at least one of the first and second electric powers.

6. The power transmission device according to claim 1, wherein the power transmission control unit is configured to determine the first electric power and the second electric power so that a sum of transmission powers transmitted by the one power transmitting unit becomes equal to or smaller than a power transmitting capability of the one power transmitting unit for a plurality of power receiving units including the first power receiving unit and the second power receiving unit.

7. The power transmission device according to claim 1, wherein a number of transmission coils included in the one power transmitting unit is one.

8. The power transmission device according to claim 1, wherein the power transmission control unit is configured to
determine some power receiving units among a plurality of power receiving units to which a priority is allocated as power transmission targets, the some power receiving units being from a power receiving unit with a maximum priority to a power receiving unit with a lower priority than the maximum priority, and
determine reception electric powers of other power receiving units are zero.

9. The power transmission device according to claim 1. wherein the power transmission control unit is configured to allocate higher priority than a priority instead of the priority of a power receiving unit to make the power receiving unit receive greater power than a case before the higher priority is allocated by using a power transmission margin in a case that the one power transmitting unit has the power transmission margin.

10. The power transmission device according to claim 9, wherein the power transmission control unit is configured to make a power receiving unit which is receiving the power from the one power transmitting unit receive greater electric power than a case before the higher priority is allocated by preferentially allocating the power transmission margin to the power receiving unit in a case that a plurality of power receiving units to which the higher priority than the priority is able to be allocated.

11. The power transmission device according to claim 9, wherein the power transmission control unit is configured to make a power receiving unit which is detected earlier receive greater electric power than a case before the higher priority is allocated by preferentially allocating the power transmission margin to the power receiving unit in a case that a plurality of power receiving units to which the higher priority than the priority is able to be allocated.

12. The power transmission device according to claim 9, wherein the power transmission control unit is configured to make a plurality of power receiving units receive greater electric power than a case before the higher priority is allocated by distributing the margin to the plurality of power receiving units in a case that the plurality of power receiving units to which the higher priority than the priority is able to be allocated.

13. A power supply system comprising:
the first and second power receiving units; and
the power transmission device according to claim 1.

14. The power supply system according to claim 13, the power supply system further comprising an electronic device configured to consume electric power received by the at least one of the first power receiving unit and the second power receiving unit.

15. A power reception device with a first priority, the power reception device comprising:
a communication unit configured to receive, from a power transmission device, information on a first electric power determined, based on the first priority, by the power transmission device, and
a power receiving unit configured to receive the first electric power indicated by the information, the first electric power being included in an electric power transmitted by one power transmitting unit, the reception being simultaneously performed when another power receiving device receives, from the one power transmitting unit included in the power transmission device, a second electric power determined by the power transmission device based on a second priority different from the first priority, the second electric power being different from the first electric power.

* * * * *